(12) United States Patent
Smith et al.

(10) Patent No.: US 6,308,740 B1
(45) Date of Patent: Oct. 30, 2001

(54) METHOD AND SYSTEM OF PULSED OR UNSTEADY EJECTOR

(75) Inventors: Brian R. Smith, Colleyville; Daniel N. Miller; Patrick J. Yagle, both of Fort Worth; Erich E. Bender, Arlington; Kerry B. Ginn, Weatherford, all of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/639,187

(22) Filed: Aug. 15, 2000

(51) Int. Cl.$^7$ ........................................................ E03B 5/00
(52) U.S. Cl. .................. 137/892; 137/896; 60/247; 60/248; 60/249; 60/226.1; 60/262
(58) Field of Search ..................... 137/892, 896; 60/247, 248, 249, 226.1, 262

(56) References Cited

U.S. PATENT DOCUMENTS

| | | | |
|---|---|---|---|
| 3,123,285 | * 3/1964 | Lee | 137/807 |
| 3,548,851 | * 12/1970 | Sampson | 137/807 |
| 3,548,853 | * 12/1970 | McEven | 137/807 |
| 3,624,751 | * 11/1971 | Dettling | 137/806 |
| 5,074,759 | * 12/1991 | Cossairt | 417/198 |

\* cited by examiner

*Primary Examiner*—A. Michael Chambers
*Assistant Examiner*—Thomas L. McShane
(74) *Attorney, Agent, or Firm*—William N. Hulsey III; Hughes & Luce, L.L.P.

(57) ABSTRACT

The present invention reveals a method and apparatus for more efficiently injecting a primary fluid flow in a fluid ejector used to pump lower velocity fluid from a secondary source. In one embodiment, the primary fluid flow is a pulsed or unsteady fluid flow contained within an inner nozzle situated within a secondary flow field. This secondary fluid flow is bounded within the walls of an ejector or shroud. The secondary and primary fluid flows meet within the ejector shroud section wherein the secondary fluid flow is entrained by the primary fluid flow. The geometry of the ejector shroud section where the primary and secondary fluids mix is such as to allow the beginning of primary injector pulse to be synchronized with an acoustic wave moving upstream through the ejector initiated by the exiting of the previous pulse from the ejector shroud. The ejector's geometric properties are determined by the acoustic properties, frequency, duty cycle, and amplitude, of the pulsed primary fluid flow. Furthermore, the frequency, duty cycle and amplitude of the primary fluid flow may be varied in order to vary the efficiency of the injector.

23 Claims, 7 Drawing Sheets

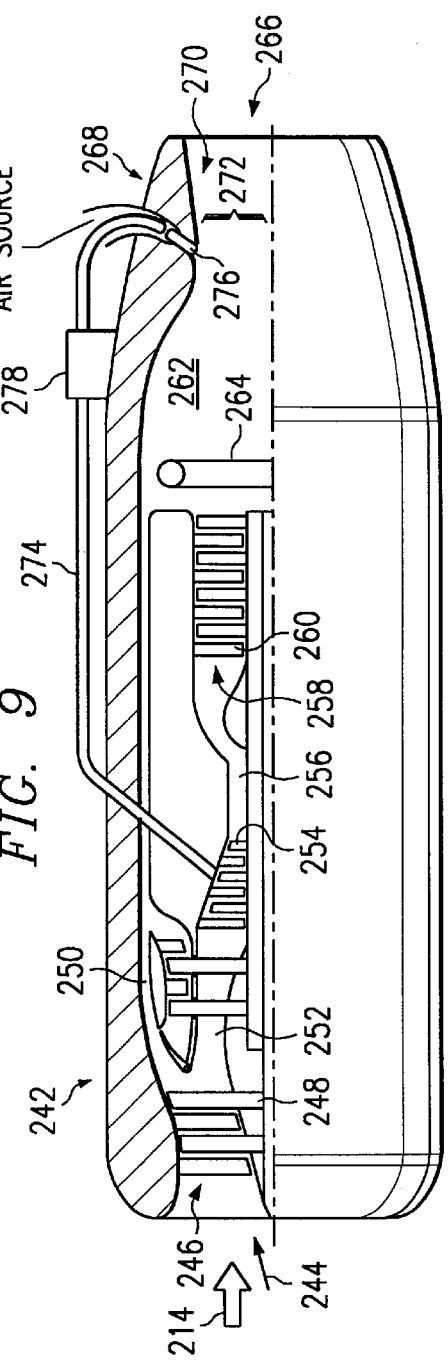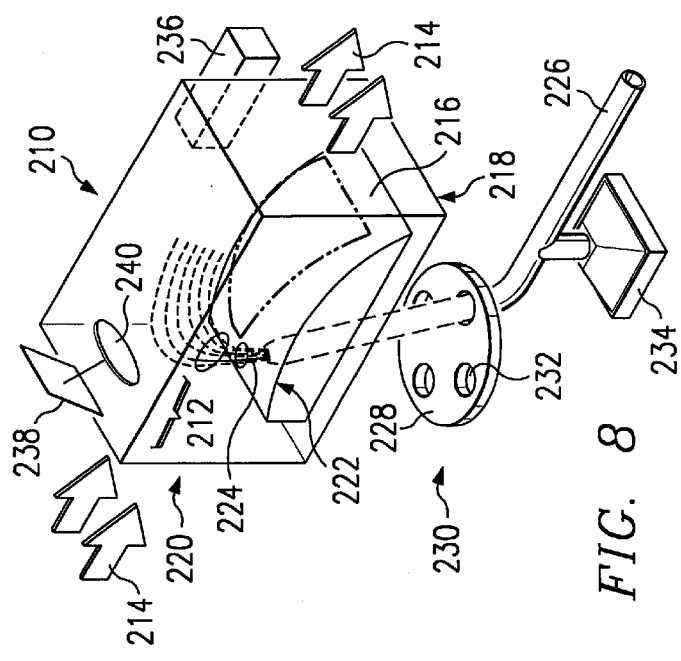

METHOD AND SYSTEM OF PULSED OR UNSTEADY EJECTOR

TECHNICAL FIELD OF THE INVENTION

This invention relates generally to the field of ejectors for pumping a fluid flow, and more particularly to an ejector in which the efficiency of mixing the primary high-velocity fluid, or jet, and the secondary low-velocity fluid is improved by pulsating the primary fluid flow into the secondary low-velocity fluid.

BACKGROUND OF THE INVENTION

In an ejector, a primary high-velocity fluid, such as a steam, gas, or vapor jet, is used to entrain and pump a secondary low-velocity fluid while mixing with it. In an ejector, the mixing of the primary high-velocity fluid and the secondary fluid occurs in the mixing section of the diffuser by sheer forces between the high-velocity stream and the secondary low-velocity fluid. Ejectors have a low power conversion efficiency due to the dissipation of energy resulting from friction forces between the primary high-velocity fluid stream and the secondary low-velocity fluid.

Jet engines create thrust by directing a high-energy exhaust stream from an exhaust nozzle. Typically, a jet engine accepts air through an inlet and compresses the air in a compressor section. The compressed air is directed to a combustion chamber, mixed with fuel, and burned. Energy released from the burning fuel creates a high temperature in the combustion chamber. The high-pressure air passes through a turbine section and into an exhaust chamber. The high-pressure air is then forced from the exhaust chamber through a nozzle, where the air exits the engine. Typically, as the air passes through the throat of the nozzle, it expands and accelerates from subsonic to supersonic speeds, essentially translating the energy of the exhaust flow from a pressure into a velocity. The energy level of the air in the exhaust chamber generally relates to the velocity of the air as it exits the nozzle. The greater the velocities of a given mass flow of air exiting the engine, the greater the thrust created by the engine.

High performance aircraft commonly augment the energy level of the air in the exhaust chamber by using an after-burner. After-burners add fuel to the exhaust chamber and ignite the fuel in the exhaust chamber. This increases the temperature of the exhaust flow. Although the energy added by after-burn fuel can greatly increase the thrust of the engine, the reduced density of the hotter air requires a larger nozzle effective throat area. Failure to increase the nozzle effective area during after-burning with a typical jet engine can cause excessive backpressure in the compressor section and turbine section, causing the engine to stall. To alleviate these difficulties, jet engines with after-burners typically use variable geometry nozzles to throttle the exhaust flow from the exhaust chamber. When an after-burn is initiated, the circumference of the nozzle's throat is increased to increase the cross-sectional flow area through the throat. This increased cross-sectional maintains a reasonable pressure in the exhaust while accommodating higher temperatures. Modern after-burning jet engines with variable geometry nozzles can require as much as a two-fold increase in cross-sectional throat area to maintain constant engine flow and back-pressure in response to the extra thermal energy added by the after-burner.

Although variable geometry nozzles allow the use of an after-burner, they also have many inherent disadvantages, which penalize aircraft performance. For instance, a variable geometry nozzle can be a significant component of the weight of an engine. Such nozzles are typically made of large, heavy metal flaps, which mechanically alter nozzle geometry by diverting exhaust flow with a physical blockage and thus have to endure the high temperatures and pressures associated with exhaust gases. In an IRIS type nozzle, typically used on after-burner equipped engines, the actuators used to adjust the nozzle flaps to appropriate positions in the exhaust flow tend to be heavy, expensive and complex because of the forces presented by the exhaust flow which the nozzle must overcome.

Further, the nozzle flaps typically constrict the exhaust flow by closing and overlapping each other, which allows hot air to escape between the flaps. These leaks cause reduction in thrust. Additionally, variable geometry nozzles are also difficult to implement on exotic nozzle aperture shapes typical of an advanced tactical fighter aircraft.

One method of overcoming this weight restriction is the use of a fixed geometry nozzle in a jet engine to inject a secondary flow of high-pressure air across the primary flow as the primary flow passes through this nozzle. The secondary flow can partially block the exhaust exiting the nozzle to increase the pressure within the exhaust chamber. When an over-pressure exists in the exhaust chamber, the secondary flow can be reduced to increase nozzle throat area and reduce the nozzle pressure.

Although the injection of a secondary flow will support a fixed geometry nozzle in an after-burning jet engine, this method also introduces inefficiencies to the operation of the engine. Primarily, the injection of air across the flow of the exhaust tends to use a large amount of high-pressure air to obtain an effective nozzle blockage. Thus, injection can introduce inefficiencies as the total momentum of the exhaust flow is decreased by the decreased flow from the compressor section into the combustion section if compressed air is bled from the compressor section for injection. This inefficiency can result in a reduced range of operations for a given fuel supply and fuel flow.

SUMMARY OF THE INVENTION

Accordingly, it is an object of this invention to decrease the inefficiency associated with the injection of high-pressure compressor air into the primary exhaust flow of a jet engine. This reduced inefficiency can result in a greater range of operations for a given fuel supply and fuel flow by decreasing the secondary flow from the compressor section into the combustion section for injection into the primary flow.

The present invention reveals a method and apparatus for more efficiently injecting a primary fluid flow. In one embodiment, the primary fluid flow is a pulsed or unsteady fluid flow contained within an inner nozzle situated within a secondary flow field. This secondary fluid flow is bounded within the walls of the ejector shroud. The secondary and primary fluid flows meet within a mixer section of the ejector wherein the secondary fluid flow is entrained by the primary fluid flow. The mixer section's geometry is such as to allow the combined injected and entrained fluid flow to mix before exiting the ejector. The mixing section's geometry is determined so as to allow a pressure wave that reflects from the open end of the secondary and moves up stream to treach the primary exit at the beginning of a primary pulse. The acoustic properties, frequency and amplitude, of the pulsed primary fluid flow determine the mixing sections' geometric properties for peak efficiency. Furthermore, the frequency and amplitude of the primary fluid flow may be varied in order to vary the efficiency of the injector.

In accordance with the present invention, a high-velocity unsteady or pulsed flow is injected into the low-velocity fluid contained within an ejector. A further object of this invention is to efficiently accelerate a low-velocity fluid such as low-pressure or ambient air using high-pressure compressor air to obtain fluidic blockage for control of a nozzle throat area. The entrained mass flow increases the total mass flow of the ejector, which is then injected into the nozzle. The pulsed ejector increases the effective blockage created by the injector as compared to injecting the ejector primary directly into the nozzle. Pulsed ejectors are more efficient than steady ejectors for both pumping and compression of a low-velocity flow using a high-pressure flow. Conventional ejectors use an available high-pressure source to pump a lower pressure fluid. For example, a small jet of high-pressure fluid is situated inside a larger shroud containing a low-velocity fluid, where the high-velocity fluid, through entrainment, pulls the low-velocity fluid through the ejector. Prior solutions utilize a steady jet where the turbulence and viscous interaction between the steady primary jet and the lower pressure secondary fluid causes a pumping action. Often, in aircraft, this concept of a steady-state ejector is used to pump cooling air through the environmental control systems of aircraft. In this ejector application, air is bled from the engine compressor to serve as the high pressure source for the ejector used to pump air through the environmental control systems in order to cool avionic systems and personnel.

A method and apparatus are provided by the present invention for reducing the weight and volume of high-pressure compressor air required for cooling by using pulsed or unsteady injection of high pressure air in lieu of steady injection in the ejector.

Mixing and compression of a primary high-velocity fluid jet stream and an entrained secondary low-velocity fluid stream in conventional ejectors occurs due to sheer forces between the two fluid streams. The friction forces between the two streams dissipate energy, resulting in low power conversion efficiency. Accordingly, it is another goal of this invention to provide an ejector in which the mechanisms responsible for pumping of the secondary flow stream by the high pressure primary fluid stream includes both entrainment due to mixing of the two streams and compression of the secondary, low-velocity fluid jet accomplished by normal pressure forces generated by the pulses in the primary high velocity jet. An ideal compression process in which minimal energy losses are encountered must be an unsteady, pulsed or intermittent cyclical process.

These and other features of the present invention are achieved for an ejector system in accordance with this invention in which a primary high-velocity fluid jet stream is effectively pulsed within an ejector passage. The ejector comprises a means for injecting an unsteady or pulsed primary high-velocity fluid jet into a shrouded secondary fluid in a cyclical manner within the injector.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 8 depicts an experimental apparatus for pulsed ejection nozzle flow control;

FIG. 9 depicts a side sectional view of jet engine equipped with pulsed ejection nozzle flow control;

DETAILED DESCRIPTION OF THE INVENTION

Preferred embodiments of the present invention are illustrated in the FIGUREs, like numerals being used to refer to like and corresponding parts of various drawings.

Figure 1:
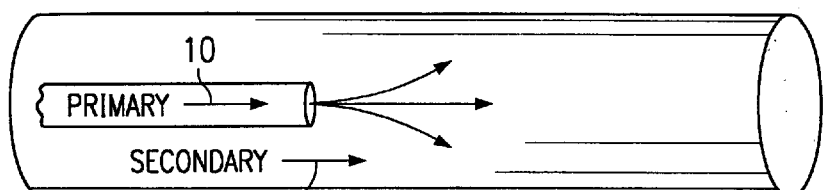
FIG. 1 illustrates a prior art ejector.
Figure 2:
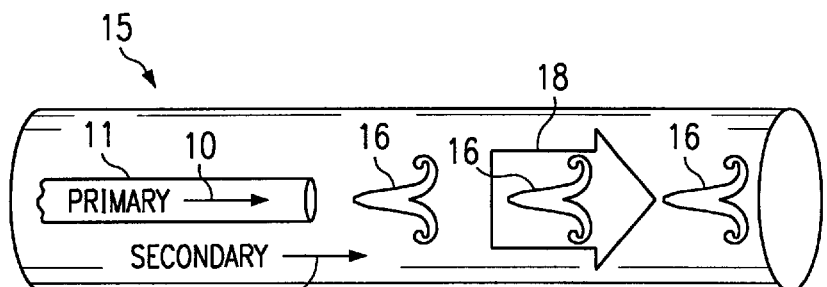
FIG. 2 illustrates one embodiment of the present invention.

As illustrated in FIG. 1, a traditional ejector works through the viscous interaction between the high-speed primary 10 and low-speed secondary fluid flows 12. The present invention is illustrated in FIG. 2, where a high-velocity primary flow 10 is provided in an unsteady or pulsed manner through a primary nozzle 11 contained within shroud 13. This tends to increase the mixing between primary fluid 10 and secondary fluid 12 with the billowing effect 16 at the exit of primary nozzle 11, thereby increasing the mixing efficiency as primary fluid 10 is pulsed. This pulsing action of primary fluid 10 allows greater entrainment between the primary fluid 10 and secondary fluid 12 and improved mixing, thus improving the overall performance of the injector 15. The mixing between the primary high-speed flow 10 and the secondary low-speed flow 12 is a viscous process that tends to be very dissipative of energy. So, although momentum is conserved in this interaction, a great deal of energy is lost as heat. Pulsing the primary high-speed flow 10 reduces the dissipative effects of the mixing between primary flow 10 and secondary flow 12. Additionally, by pulsing primary flow 10, an acoustic wave is generated in the downstream flow 18. This acoustic wave comprises an elastic interaction with secondary flow 12 in addition to a mere mixing phenomenon. This allows a more efficient transfer of energy from primary flow 10 to secondary flow 12.

Computational fluid dynamic simulations (CFD) indicate that as the pulsing frequency of primary fluid 10 is varied, the efficiency of the ejector varies, as well. The efficiency is measured as the mass flow rate of the secondary to the mass flow rate of the primary. The higher the ratio, the better or more efficient the ejector is.

Figure 3:
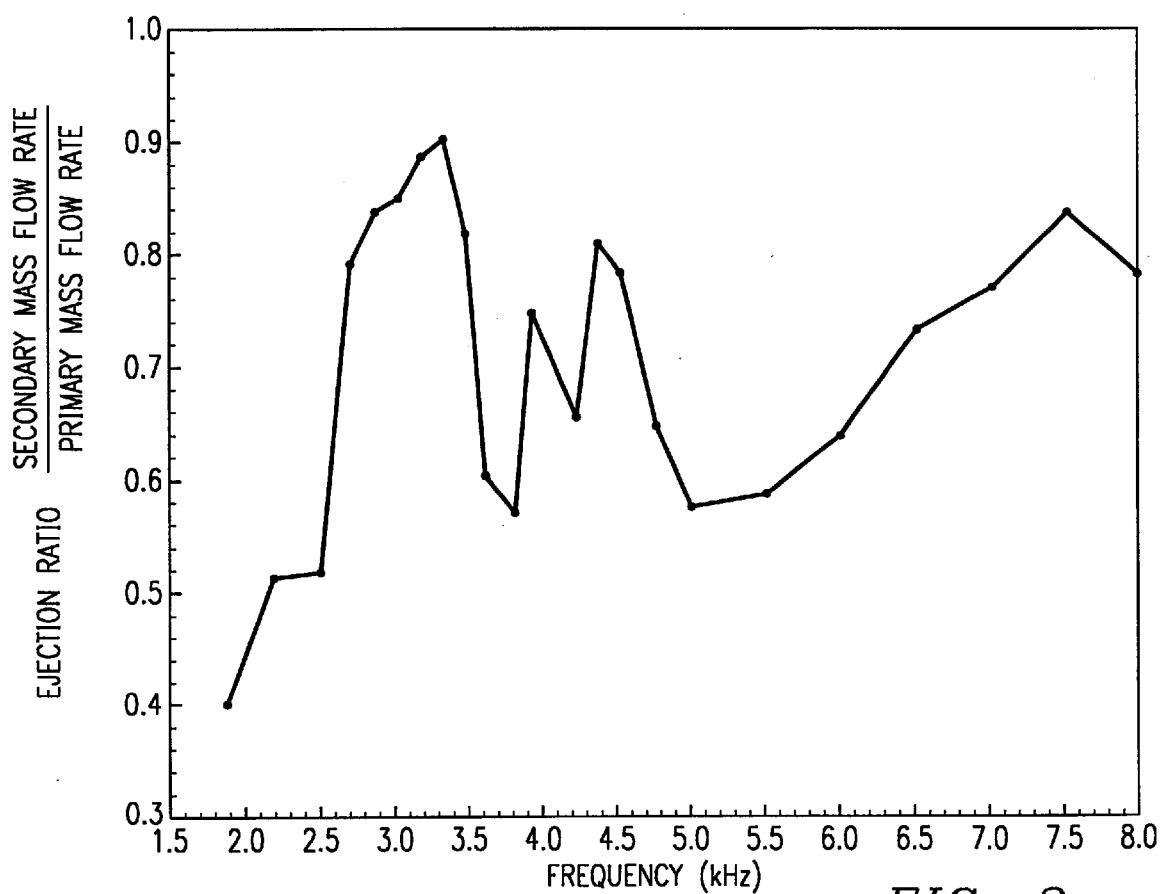
FIG. 3 provides a graphic representation of ejector efficiency as a function of frequency.

FIG. 3 illustrates the ejection ratio, or efficiency, as a function of frequency for one such injector of the present invention. As FIG. 3 shows, even relatively small changes in frequency produce large changes in the effectiveness or ejection ratio. The ejection ratio is a measure of the secondary mass flow rate to the primary mass flow rate. This illustrates that mixing of the primary and second flows is not the main process observed. Rather, the ejection ratio is a function of acoustic effects, as shown by the fact that a relatively small change in frequency can greatly effect the ejection rates. If mixing was the main component associated with the ejection ratio, changes in frequency should not have large effects on the ejection ratio or efficiency. As shown in FIG. 3, for example, a change in the injection rate of 3300 Hz to 3700 Hz results in a change of the efficiency or ejection ratio from 0.9 to 0.5.

These frequencies and wavelengths are associated with the geometry of the injector length. For example, the frequency is a harmonic or multiple of the length of the injector.

Figure 4A:
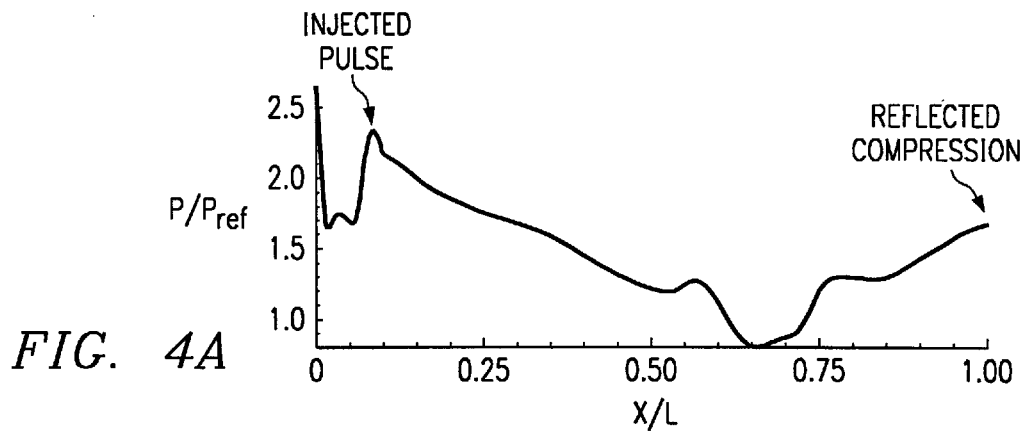
FIGS. 4A–4F further depict the propagation of pressure waves in an ejector operating near optimal frequency.
Figure 4B:
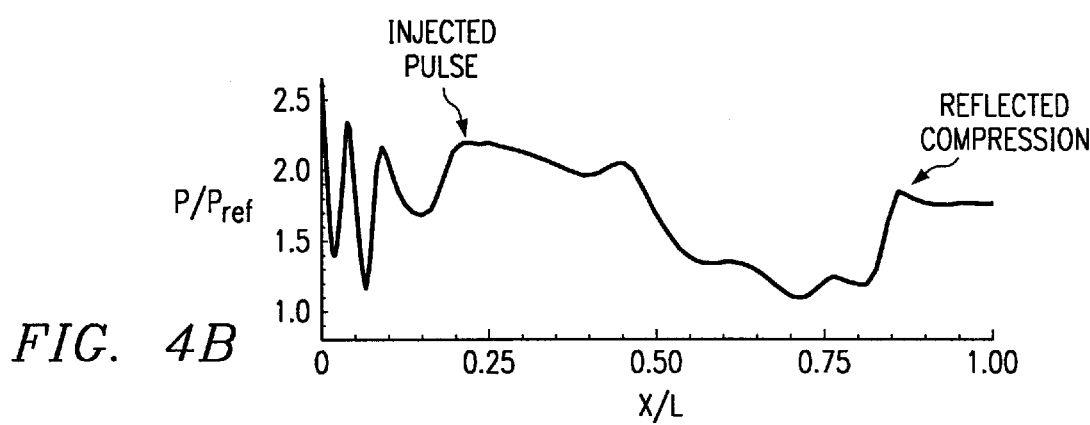
Figure 4C:
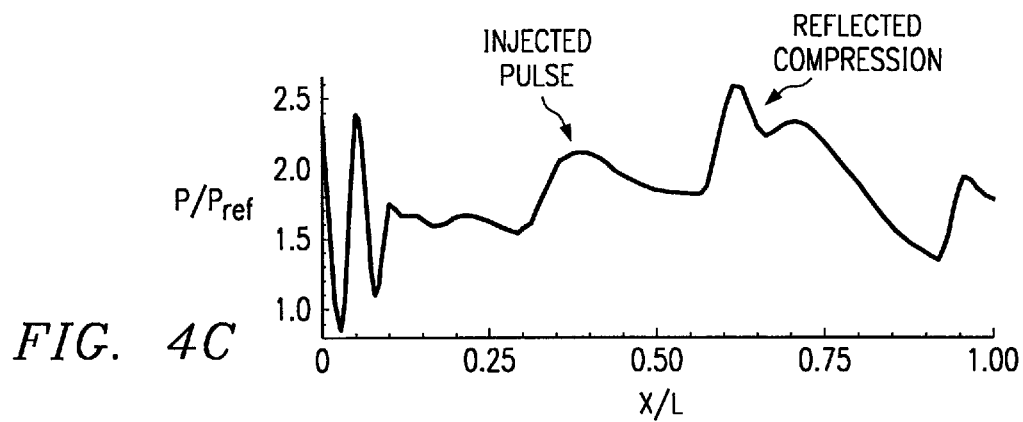
Figure 4D:
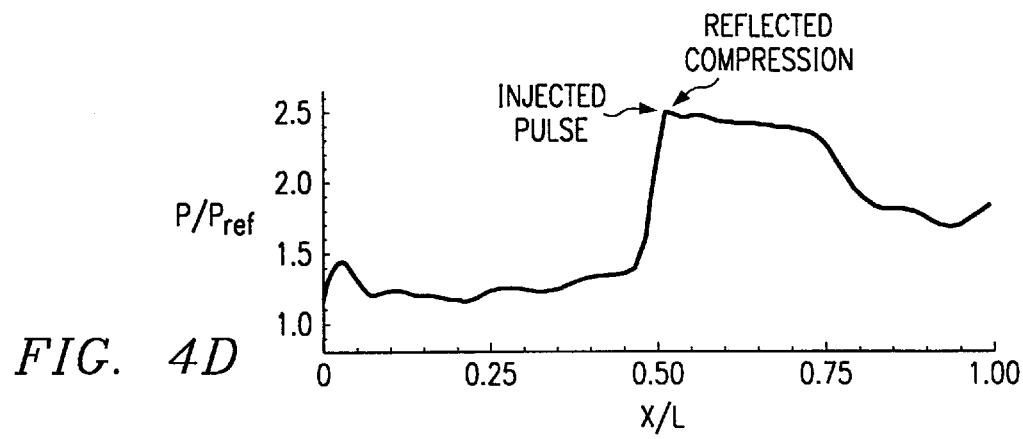
Figure 4E:
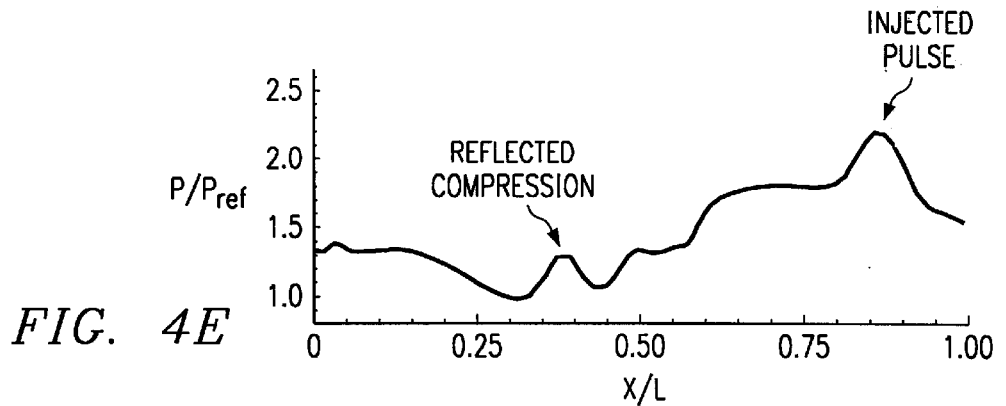
Figure 4F:
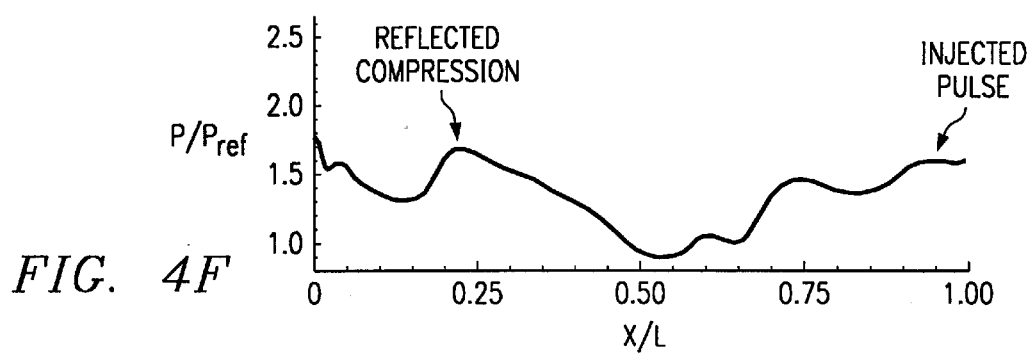

FIGS. 4A through 4F further illustrate the frequency effect and that the acoustic effect is a critical variable in this process. FIGS. 4A–4F illustrates the pressure along the injector centerline between the primary exit at X/L=0, and the secondary exit at X/L=1 at 3300 Hz, an effective primary frequency for this particular design. In FIG. 4A, a pressure peak resulting from the beginning of pulse of the primary is observed at X/L=0.1, while a second peak, a reflected compression wave, is observed near X/L=1. At the succeeding ⅙ intervals in the pulse period, FIGS. 4B–F show the translation of the injected pulse downstream, (positive X/L) and the translation of the reflected pulse upstream. When the reflected compression reaches the primary, the next primary pulse begins. By synchronizing the beginning of the injected pulse with the arrival of the reflected wave, the strength of the injected pulse is amplified, resulting in a stronger wave for pumping of the secondary flow. The frequency for optimal ejector performance is associated with the length of the injector, in that as a pulse 17 exits the primary nozzle 11, a wave propagates forward and then rarefaction and compression waves comes back upstream. Thus, a primary or related harmonic have the optimal frequency.

An additional benefit of a pulsed ejector relative to a steady ejector is that, dependent on the geometry, the length of the injector 19 required for pulsed injection may be shorter than necessary for steady-state ejection due to the fact that complete mixing can be achieved in a much shorter distance than required for steady ejectors. In a real-world application, such as a tactical aircraft, this has a potential advantage in that, with a shorter length ejector, the weight and volume of the system can be reduced.

One of the added benefits of this system is that in order to increase the control of a fluidic nozzle, one of the key variables to that control is mass flow. By increasing the injected mass flow used for control of a fluidic nozzle, it is possible to achieve a higher vector angle of the exhaust flow. Using existing solutions, this increased mass flow in the injector requires additional high-pressure compressor air to be bled from the compressor stage, resulting in an overall reduced efficiency of the jet engine. Using the pulsed ejector of the present invention as the injector for nozzle control allows the mass flow of the injector to be increased. Secondary flow may be tapped from an ambient, external source, or other low-pressure source, and mixed with high-pressure air, thus boosting the injected mass flow without reducing the overall engine efficiency by reducing the diversion of high-pressure air from the compressor stage. Thus, the present invention allows injectors and other loads on high-pressure compressor stage air to be reduced.

Figure 5:
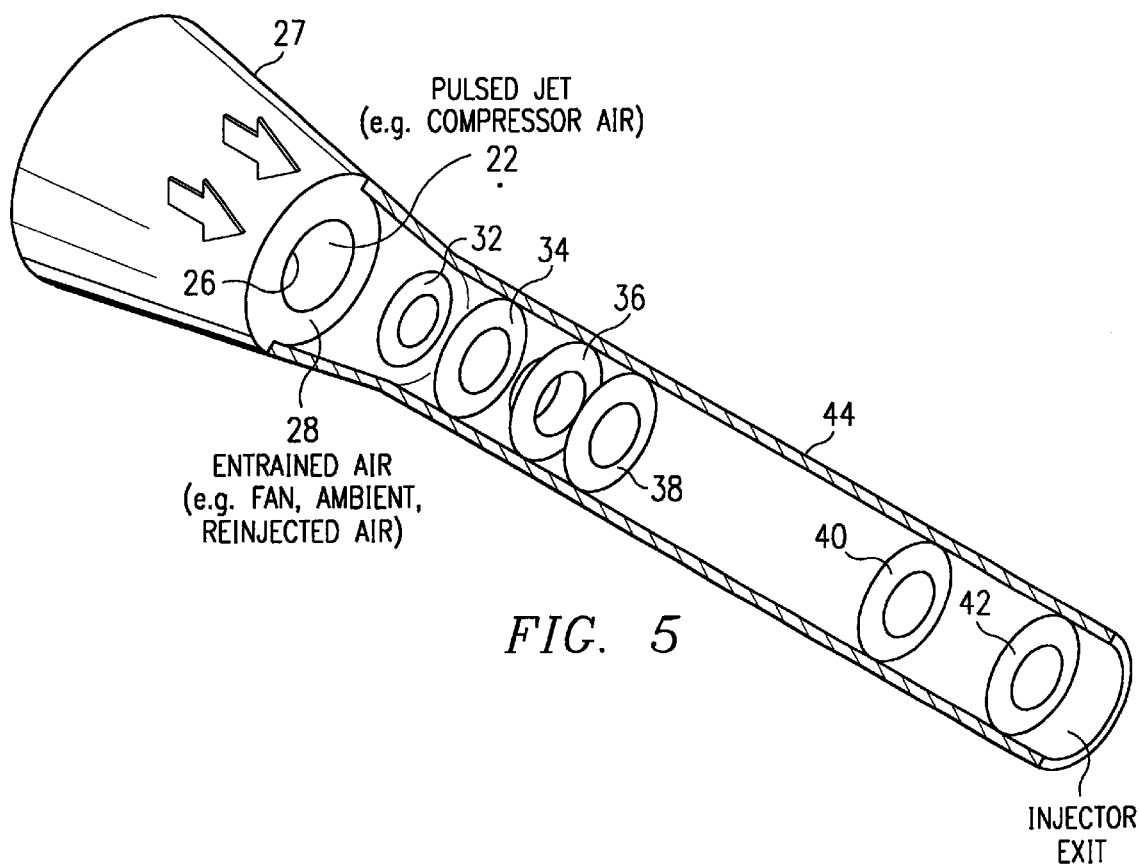
FIG. 5 depicts an ejector of the present invention incorporated into an ejector and the mixing of primary high-velocity and secondary low-velocity fluids.

Another embodiment of the present invention is illustrated in FIG. 5, which shows a pulsed jet 22 of a high-pressure air source contained within an inner nozzle 26 and shrouded by injector shroud 27. Low-pressure air, such as fan, ambient or re-injected air 28, is contained within shroud 30. CFD illustrations 32, 34, 36, 38, 40 and 42 illustrate the mixing of the primary pulsed jet 22 with the entrained air 28 as an acoustic wave where the efficiency of the mixing is effected by several variables associated with the pulsed jet of high-pressure air, including the pulsing frequency, amplitude, the injector 44 length, and the area ratio. These CFD illustrations show that an area ratio may be chosen such that primary flow is dissipated at the boundaries of the injector 44. A design of experiment (DOE) approach can be used to characterize the effect of these variables on the injector ratio or efficiency of the ejector. The frequency, for example, is inversely proportional to the length of the ejector.

In addition to the application of such a pulsed ejector for control by injection of the effective throat of a fixed geometry nozzle, such an ejector can be used to pump additional mass flow in the ventilation or environmental control system of an aircraft. CFD results indicate it is possible to boost the pumping effectiveness over a steady-state ejector on the order of 100%, essentially allowing one to double the amount of pumped mass flow by pulsing the ejector.

Other applications for such an ejector would be an industrial application such as a smokestack, where it may be desirable to direct a plume of a smokestack with ejectors to drive the smoke and exhaust in a certain direction. Another application would be use of a pulsed synthetic jet as a primary injection in a pulsed ejector for use in cooling electronic equipment. Another variable to be manipulated or optimized is the area ratio of the primary high-pressure flow to the secondary flow. Ideally, the primary flow should be dissipated at the edge of the secondary flow. Some embodiments of the present invention have used ratios in the range of 2:1 or 3:1 for the ratio of the secondary flow area to the primary flow area. However, the present invention need not be limited to this range.

Figure 6A:
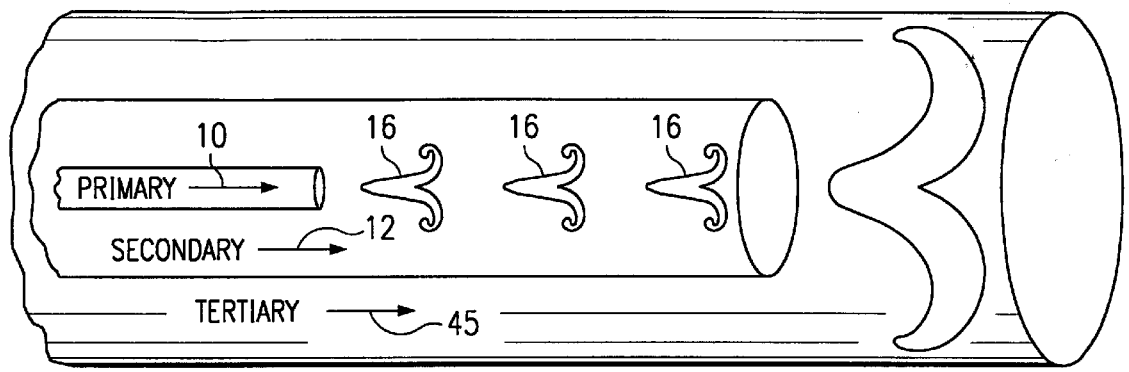
FIGS. 6A and 6B depict the compounded or staged use of ejectors provided by the present invention.
Figure 6B:
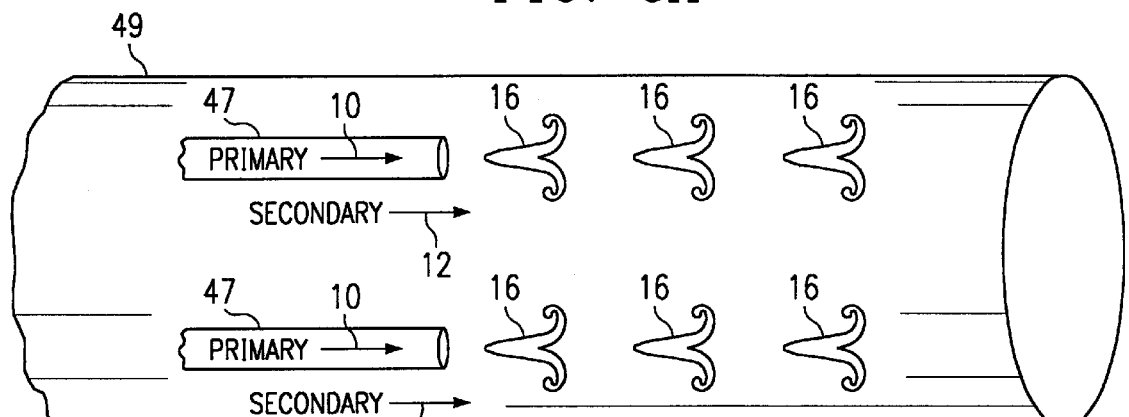

Other embodiments of the present invention include potentially nesting the primary flow 10 and secondary flow 12 inside a tertiary or additional low-pressure flow 45 in order to stage the ejectors. In this manner it is possible to achieve a larger, more efficient large-area ejector as shown in FIG. 6A Alternatively, it may be desirable, in a case where there is a large-area ratio as illustrated in FIG. 6B, to distribute multiple primary jets 47 over the secondary source 49.

Figure 7A:
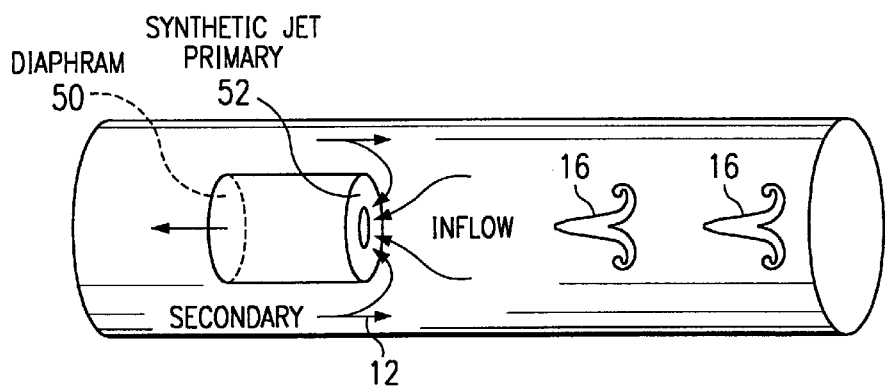
FIGS. 7A and 7B illustrate a synthetic ejector.
Figure 7B:
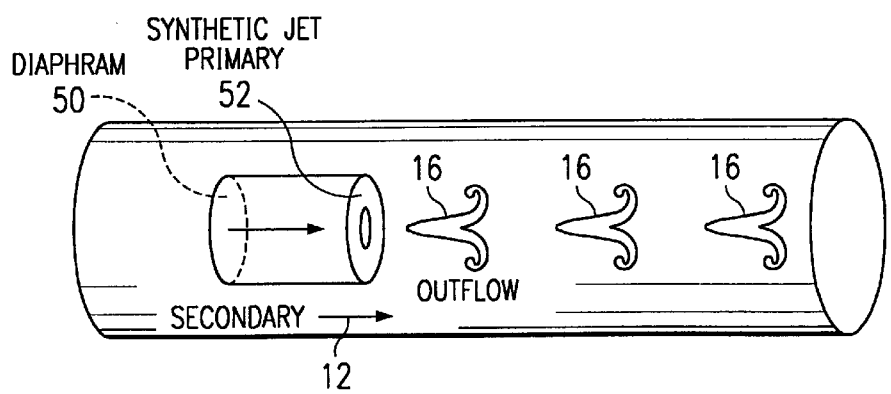

An additional embodiment is illustrated in FIGS. 7A and 7B, where a zero net mass flux jet, also known as a synthetic jet, is used instead of a pulse jet as the primary jet flow. For a zero net mass flux jet, an oscillating diaphragm 50 is located at one end of plenum 51, while the primary orifice 52 is located at the opposite end of plenum 51. Diaphragm 50 oscillates back and forth, causing an unsteady jet to issue from orifice 52. On the out-stroke of this synthetic jet, illustrated in FIG. 7A, jet outflow 55 is produced in a narrow stream confined by orifice 52. However, during the in-stroke shown in FIG. 7B, the diaphragm draws in secondary fluid 53, from all areas surrounding orifice 52. This is achieved because when diaphragm 50 pulls back, air re-enters from all directions. Air does not come back just in a straight jet, so a net average over time produces a flow field such as one produced by a jet.

The jet flow from the nozzle of the zero mass flux jet enters the ejector shroud 56 and then pumps secondary airflow 53 using both entrainment and acoustic waves as with the pulse jet embodiment of the pulsed ejector. This concept results in a valveless pump. The combined flow of the zero net mass flux jet and the entrained secondary flow has a much higher total mass flow than the outflow portion of the zero mass flux jet alone, and the resulting jet is more steady.

The diaphragm may be driven by piezoelectric devices, electro-mechanical, entirely mechanical, or other means. For aerospace applications, this produces a self-contained primary jet with no compressor air bleed. Here, the force on the diaphragm will determine the strength of the primary jet. This synthetic jet need not be limited to aircraft type applications. This synthetic jet could be produced on a micro scale and incorporated into or fabricated as part of microelectronic or micromechanical devices to serve as an internal pump to cool such devices. Referring now to FIG. 8, an experimental apparatus for determining the effectiveness of pulsed injection is depicted. A flow container 210 having a rectangular shape defines a flow field 212, which contains a fluidic flow 214. Fluidic flow 214 passes over a nozzle contour 216 and leaves flow container 210 at container exit 218. Nozzle contour 216 cooperates with flow container 210 to form a nozzle 220. The cross sectional area of the opening of nozzle 220 varies along the longitudinal flow axis according to the area of the plane between the surface of nozzle contour 216 and the top wall of flow container 210 that is perpendicular to the longitudinal axis and the general vector of fluidic flow 214. Nozzle 220 constricts fluidic flow 214 with nozzle contour 216 in only one dimension to provide an accurate means for testing the effects of a fluidic flow. In other embodiments, nozzle 220 can include any convergent nozzle, divergent nozzle, or combination of convergent and divergent nozzles that accelerate or direct a fluidic flow by constricting the flow. Nozzle 220 has a throat 222 defined as the point along nozzle 220 of greatest constriction, the nozzle opening having the smallest cross sectional area at the throat.

A fluidic flow is provided to the opening through nozzle 220 by a pulsed ejector 224 that is incorporated with nozzle contour 216 proximate to throat 222. Pulsed ejector 224 may be a pulsed ejector as taught by the present invention. Pulsed ejector type injector 224 receives highly pressurized fluid from a duct 226 and a lower pressure fluid that is to be pumped by the unsteady ejector. The ejector and provides a mixed supply of pressurized fluid into a flow field 212 through a port formed at the end of pulsed ejector 224.

FIG. 8 depicts two separate controllers for pulsing the primary fluid entering the pulsed ejector 224 which then is injected into nozzle 220 at throat 222. A high speed mechanical valve 228 provides periodic modulation of the pressure to pulsed ejector 224 by rotating a ring 230 with valve openings 232 so that ring 230 periodically blocks flow through duct 226 and periodically allows flow through duct 226 when valve opening 232 corresponds to duct 226. The mechanical valve can provide a square pulse wave form having an amplitude that shifts from zero primary flow to the ejector to full primary flow to the injector in a short transition time. FIG. 8 also depicts an acoustic pulse vibrator 234 associated with pulsed ejector 224. Acoustic pulse vibrator 234 can be any vibrational device that provides modulated energy to duct 226. For instance, a piezoelectric vibrator can provide acoustic energy, similar to the energy produced by a stereo sound system. An acoustic vibrator can produce a wide variety of waveforms. In other embodiments, any effective means of modulating a flow can be used.

Pulsed ejector 224 provides a modulated, weakly pulsed fluidic flow with a much higher mass flow than would be obtained by the primary alone. The primary pulse is determined by a controller, such as mechanical valve 228 or acoustic pulse vibrator 234. The controller associated with pulsed ejector 224 can vary the pulse of the fluidic flow to have a predetermined frequency, amplitude, or waveform. For instance, mechanical valve 228 can vary the frequency of the pulse provided to the pulsed ejector 224 by varying the rate at which ring 230 rotates. In operation, the main fluidic flow 214 passes through flow container 210 towards container exit 218 along flow field 212. The fluidic flow can be any fluid, such as liquids or gases. As fluidic flow 214 passes through throat 222 of nozzle 220, pulsed ejector 224 injects a mixed, pulsed primary and secondary fluidic flow across the main flow field 212. Although FIG. 8 depicts injection of ejector outflow that is generally perpendicular to the main flow field 212, the flow could be injected at any angle opposed to or with the direction of fluidic flow 214. Blockage of the main flow through a nozzle by an injected flow is related to the extent of penetration of the injected flow into the main flow. The penetration of an injected flow into a main flow is controlled by the injected/main flow momentum flux ratio, which is related to the mass and velocity of the main and injected flows, and the change in velocity of the flow as it pulses. The greater the mass and velocity of a injected flow exiting a pulsed ejector relative to the mass and velocity of the main flow passing by the pulsed ejector, the greater the penetration of the injected flow into the main fluidic flow path. Increased penetration of the injected flow can provide greater blockage of the main flow through the nozzle, effectively decreasing the cross sectional area of the nozzle opening at the point of penetration.

The apparatus depicted in FIG. 8 allows an experimental determination of maximum blockage for a particular nozzle contour with a main flow and a variety of injected flows. First, a baseline for the blockage caused by steady-state injection can be determined for a particular main flow to injected flow velocity ratio. An unsteady flow or pulsed or modulated flow issuing from a pulsed ejector, can then be injected into the main flow, with the unsteady or pulsed primary flow feeding the ejector having the same mean flow rate as the steady injected flow. At proper frequencies, amplitudes and waveforms of the injected primary, the pulsed ejector provides enhanced blockage over the blockage provided by steady state injection the high pressure primary alone due to the higher mass flows obtained with the pulsed ejector. The pulsed flow can be tuned by testing different pulsing frequencies, amplitudes and waveforms to achieve maximum blockage for a given mean flow rate of the pulsed ejector. Thus, a pulsed ejector can increase fluidic blockage of a main flow through a nozzle as compared to the blockage provided by a steady-state injector because the periodic modulation of the primary injectant to the ejector provides a net increase in time-averaged injected mass flow.

FIG. 9 depicts a jet engine configured with a pulsed fluidic secondary flow pulsed ejector type injector according to the present invention. A primary flow 214 of air enters jet engine 242 through intake 244. Fan section 246, comprised of a plurality of rotating fan blades 248, pushes flow 214 into bypass section 250 and compressor section 252. Compressor section 252 is comprised of a plurality of compressor blades 254 which compress flow 214 into combustion chamber 256. Fuel is mixed with flow 214 in combustion chamber 256 and ignited, thereby adding energy to flow 214, resulting in an increased temperature of flow 214 in combustion chamber 256. Pressure within combustion chamber 256 forces flow 214 into turbine section 258, which is comprised of a plurality of turbine blades 260. Turbine section 258 removes some energy from flow 214 to power compressor section 252 and fan section 246. Flow 214 then passes into exhaust chamber 262 where it combines with the flow from bypass section 250. An afterburner 264 can provide additional fuel which can be ignited to increase the energy of flow 214. Flow 214 is then expelled from engine 242 through exit 66 as an exhaust flow.

Engine 242 creates thrust related to the velocity of the mass and density of the air of flow 214 over a given time period. Typically, in a jet engine, flow 214 is a subsonic flow of air until it reaches throat 270. A nozzle 268 cooperates with exit 266 to accept flow 214 from exhaust chamber 262 and to accelerate exhaust flow 214 to higher velocities, typically supersonic velocities. To achieve optimum acceleration of the exhaust flow, nozzle 268 converges the flow at throat 270, which is the point or section in nozzle 268 having the smallest cross sectional area, the constriction of throat 270 typically accelerating the flow to a sonic velocity, and a supersonic velocity after throat 270. Constriction of the flow at throat 270 operationally translates energy in the flow from pressure and temperature into velocity, thus creating thrust opposite to the vector of flow 214 as flow 214 exits nozzle 268. Although nozzle 268 is depicted as a fixed geometry nozzle, it should be understood that variable geometry nozzles could be incorporated with the present invention to enhance control of the exhaust flow.

An air duct 274 collects high-pressure air from flow 214 at compressor section 252 and provides the high-pressure air to pulsed ejector type injector 276. In alternative embodiments, air duct 274 can collect air from bypass section 250 combustion chamber 256 or any other portion of engine 242 having high-pressure air. In an alternative embodiment, a separate compressor can provide high-pressure air to air duct 274. A controller 278 controls the pressurized air in duct 274 to create an unsteady or pulsed secondary flow and to send that secondary flow to pulsed ejector type injector 276 for injection proximate to nozzle 268. Proximate to nozzle 268, as used herein, means a position that will result in some blockage of nozzle opening 272 by the interaction of the secondary flow from pulsed ejector type injector 276 and exhaust flow 14 exiting exhaust chamber 262. Air duct 274 can provide compressed air to two or more opposing injectors 276 located on opposite sides of the interior wall of nozzle 268.

In operation, controller 278 can vary the frequency, amplitude, and waveform of the pulsed secondary flow from pulsed ejector type injector 276 so as to optimize performance of engine 242. For instance, to enhance the acceleration of exhaust flow 214 as it exits from exhaust chamber 262 through exit 266, the effective cross sectional area of nozzle opening 272 can be made smaller. Controller 278 can direct each of opposing injectors 276 to inject a pulsed secondary flow having mass flow and pulse characteristics adequate to effectively decrease the cross sectional area of opening 272 of nozzle 268 to not only ensure proper acceleration of exhaust flow 214, but also to throttle flow 214 to control the pressure and temperature within exhaust chamber 262. If each pulsed ejector type injector 276 injects a secondary flow with similar characteristics, flow 214 can be accelerated without changing its vector. In one embodiment, a mechanical valve could provide a square pulse waveform with a frequency of between 100 and 1000 hertz. In another embodiment, each pulsed ejector type injector 276 could be controlled by its own associated controller 278. Controller 278 can include a processor and software to control a nozzle's effective cross sectional area over a range of operating conditions.

When engine 242 is operated at varying power settings, the energy level of flow 14 is varied by, for instance, fluctuation of the amount of fuel in combustion chamber 256. A greater energy level added to flow 214 increases the pressure and temperature in exhaust chamber 262. Typically, jet engines increase the cross sectional area of the nozzle when afterburner is selected. At high flow energy levels, controller 278 can direct pulsed ejector type injector 276 to provide a secondary flow with decreased blockage to reduce pressure in exhaust chamber 262 by creating a greater effective cross sectional area in opening 272. When the energy level of flow 214 is maximized by providing fuel into exhaust chamber 262 with afterburner 264 the exhaust flow in exhaust chamber 262 can create an over-pressure which can cause a backflow of air through bypass chamber 250 and, in extreme situations, through turbine section 258. To minimize the effects of the backpressure created in exhaust chamber 262 by initiation of afterburner 264, controller 278 can direct pulsed ejector type injector 276 to provide no or just minimal blockage of nozzle opening 272, thus effectively increasing the cross sectional area of nozzle opening 272. Those skilled in the art will appreciate that the system depicted in FIG. 9 can perform or supplement the functions of a variable geometry nozzle to adjust the effective cross sectional area of a nozzle over a jet engine's full power range.

Figure 10:
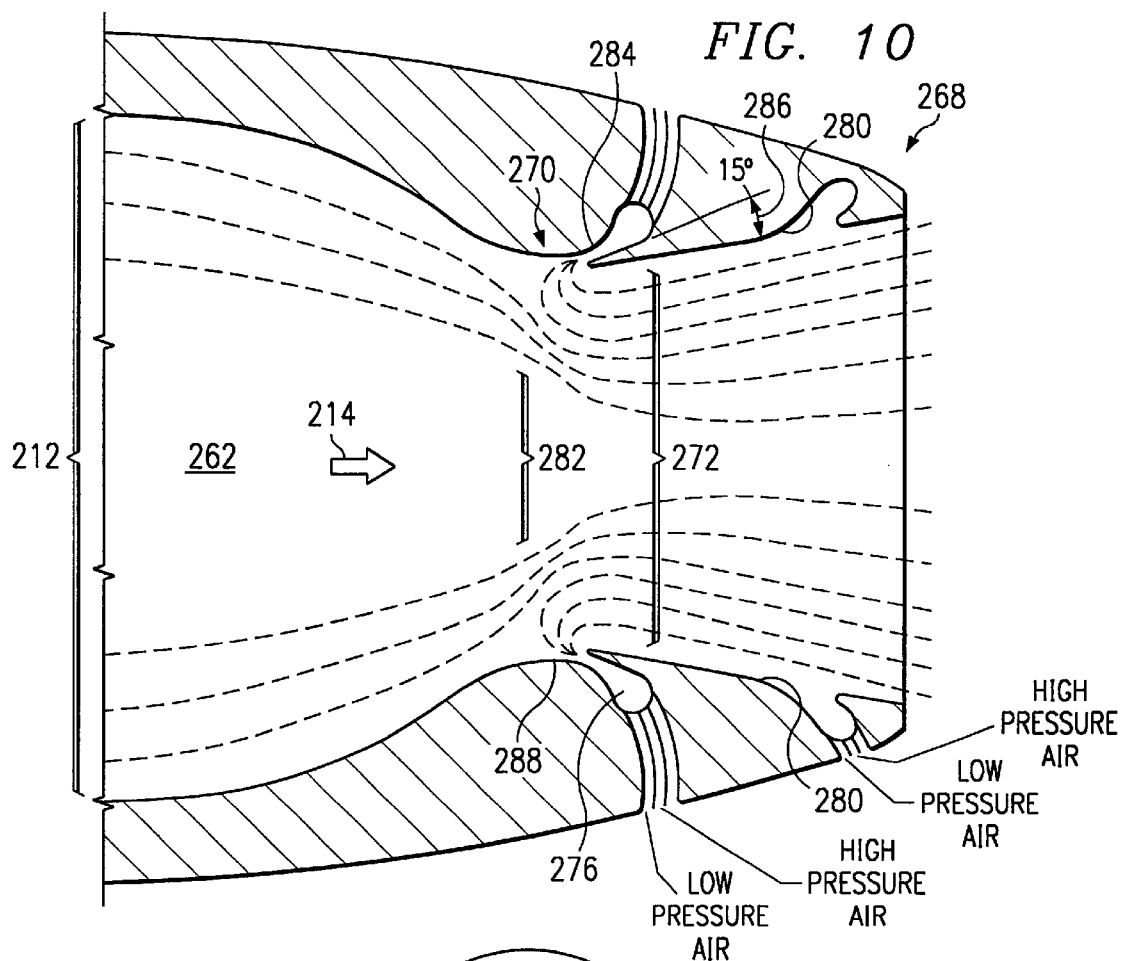
FIG. 10 depicts a side sectional view of ejectors incorporated in a nozzle.

FIG. 10 depicts one embodiment of injectors 276 and 277 according to the present invention, and the effect that injectors 276 and 277 can have on flow 214 exiting an exhaust chamber 262 through nozzle opening 272. When injectors 276 and 277 are turned off so that they do not inject a secondary flow, the effective cross sectional area of nozzle opening 272 is defined by the area of the plane generally perpendicular to flow 214 between the walls 280 of nozzle 268. When symmetric and opposed injectors 276 and 277 provide similar secondary flows 284 and 285 into flow 14, the secondary flows evenly block the nozzle's opening to vary the nozzle's discharge coefficient decreasing the effective cross sectional area of nozzle opening 272 to the area depicted by numeral 282. The nozzle's discharge coefficient is analogous to an effective cross sectional flow area. Thus, nozzle opening 272 depicts an effective cross sectional area that could correlate to an engine in afterburner, and nozzle opening 282 depicts an effective cross sectional area that could correlate to an engine when not afterburning.

Modern jet aircraft typically use variable geometry nozzles to control throat area. In an afterburning turbofan engine, as much as a two-fold increase in throat area can be required to throttle engine operating pressure and control stall margin during afterburner operation. To achieve a minimum possible effective throat area, pulsed ejector type injector 276 and 277 can include several features in addition to pulsed flow.

First, pulsed ejector 276 and 277 may provide an airflow with maximum penetration and blockage into the primary flow 214. To achieve the best penetration, pulsed ejector type injector 276 should provide a sonic or supersonic secondary flow 284, such as can be obtained from a choked pulsed ejector type injector having an expansion area ratio of approximately 1.1. The supersonic velocity of the injected secondary flow should also provide optimal mass flow characteristics. Injectors 276 and 277 should provide a secondary flow with a corrected mass flow parameter and secondary to primary total pressure ratio that are as large as possible to enhance reduction of the nozzle's discharge coefficient. For example, an injected corrected mass flow of between 5% and 10%, and a total pressure ratio of between 2 and 8, relative to the primary flow, are estimates of the maximum allowable properties within aircraft system weight and volume design constraints. In one alternative embodiment, the mass flow characteristics could be further enhanced by the addition of ignited fuel or other injectants to the secondary flow.

Next, the orientation and location of injectors 276 and 277 can be arranged to maximize blockage of the main flow 214. Injectors 276 and 277 provide secondary flow 284 that is at an injection angle 286 from being completely opposed to the direction of main flow 214 along the longitudinal axis of nozzle 268. FIG. 10 depicts angle of 286 as 15 degrees from the longitudinal axis of nozzle 268, although angles of between zero and 30 degrees will provide enhanced blockage of nozzle opening 272. In one alternative embodiment, the angle 286 of injectors 276 and 277 can be adjusted to a range of values. Pulsed ejector type injector 276 is located at the beginning of throat 270 so that the secondary flow from pulsed ejector type injector 276 is aimed into the subsonic portion of the nozzle flow field 12. Injection of the secondary flow into the subsonic portion of the flow field prevents the formation of shocks, which can significantly impact the nozzle's thrust efficiency.

Figure 11:
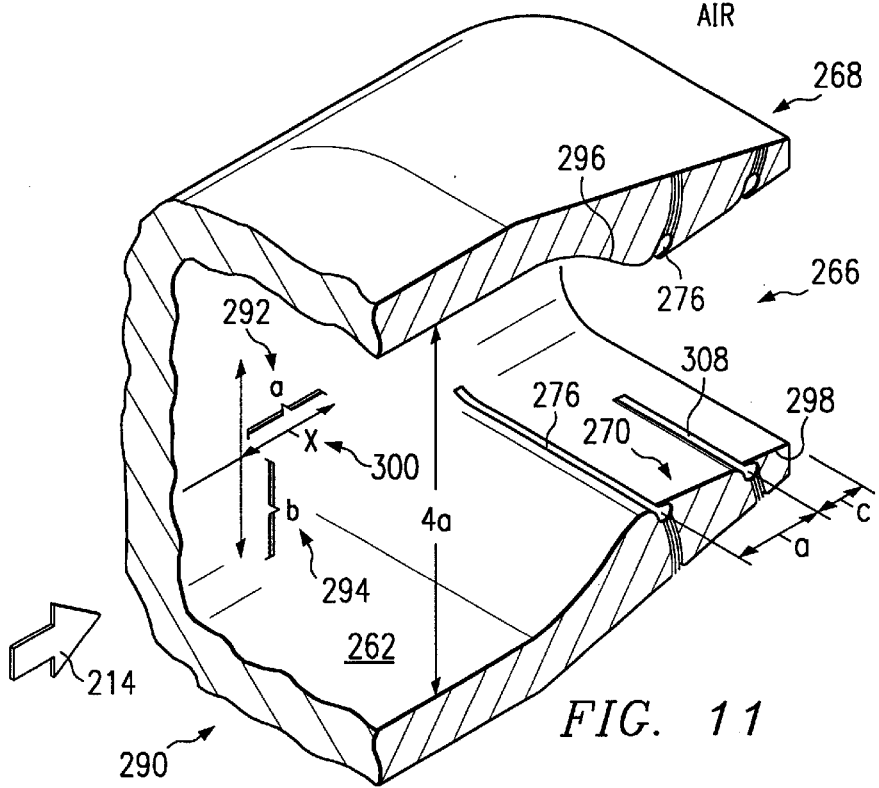
FIG. 11 depicts a perspective sectional view of a nozzle having slot ejectors incorporated at its throat.

Finally, injectors 276 and 277 can be incorporated into various nozzle designs so that the nozzle design, pulsed ejector type injector mass flow characteristics, pulsed ejector type injector orientation, pulsed ejector type injector location and the secondary flow pulse characteristics cooperate to provide maximum blockage for a given secondary flow. Referring to FIG. 11, one effective internal nozzle convergence contour is depicted. Exhaust chamber 262 is adapted to accept engine exhaust at an afterburner duct 290, and to provide the exhaust to throat 270. Exhaust chamber 62 has a high discharge, smooth transition contour shape. Although exhaust chamber 262 can have a variety of profiled choked nozzle convergence shapes to enhance the effect of injectors 276, an ellipse shape is depicted in FIG. 11. The ellipse shape has a major axis 292 with vertices along its major axis having a length depicted as a, and a minor axis 94 with a vertices along its minor axis having a length depicted as b. The afterburner duct 290 that leads into exhaust chamber 262 has a diameter proportional to major axis 292, such as four times the distance a. Length b of minor axis 294 establishes the contraction ratio of nozzle 268, meaning the ratio of the areas of afterburner duct 290 and throat 270, and can be set at a value similar to that of the F110-GE-129 turbofan engine's nozzle, such as approximately 1.8.

The ellipse shape of exhaust chamber 262 depicted in FIG. 11 blends into throat 270 with a fille-tradius shaped convergence section 296. Throat 270 has a constant area along a throat length from its intersection with convergence section 296 to its intersection with a divergent section 298, the length being proportional to major axis 292, such as a length of a. The nozzle's discharge coefficient is raised without injection and lowered with injection. Divergent section 298 accepts flow 214 from throat 270 and directs flow 214 along a length c of approximately 12 inches to ensure reattachment of flow 214 to the walls of nozzle 268 before flow 214 is discharged through exit 266. Divergent section 298 has a low degree of expansion, such as an expansion area ratio of 1.1–1.3 where expansion area ratio is defined as the cross sectional area at exit 266 divided by the cross sectional area of throat 270. The low degree of expansion of divergent section 298 reduces the nozzle's discharge coefficient with injection.

Throat 270 can have a number of aperture shapes, including an axisymmetric, rectangular (2-D), elliptical, diamond, triangular shapes, and other low observable RADAR and IR configurations. FIG. 11 depicts a rectangular throat aperture which supports two opposing injectors 276 formed as slots that encompasses the full periphery of the top and bottom of the rectangular-shaped throat 270. Each pulsed ejector type injector 276 can provide a uniform flow along the entire slot from a single duct, or can include a number of smaller injection components within each slot which can cooperate to provide a uniform flow or a flow that varies along the slot. Pulsed ejector type injector 276 is placed within throat 270 proximate to exhaust chamber 262, such as one nozzle throat radius from the nozzle's centroid 300.

Figure 12:
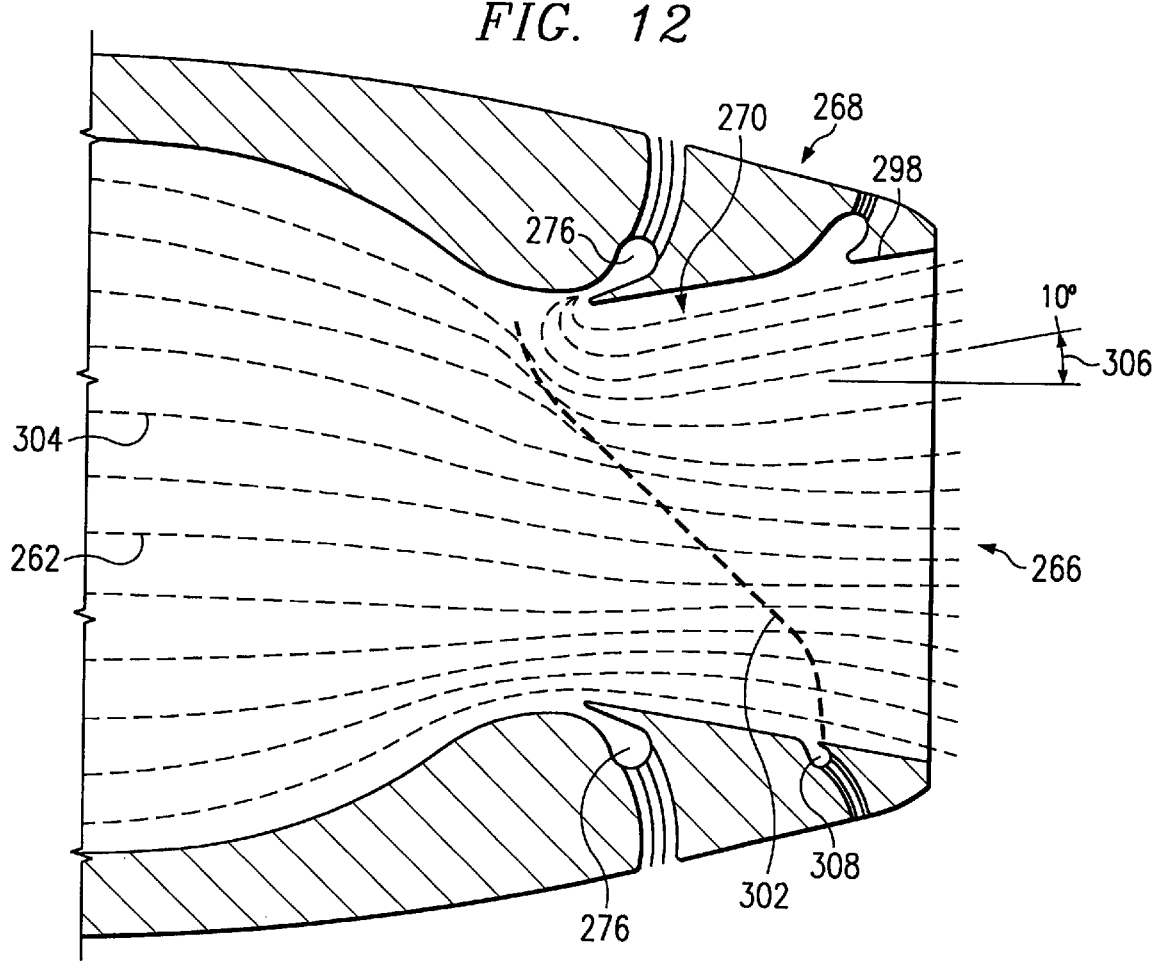
FIG. 12 depicts a side sectional view of a nozzle providing asymmetric ejection to vector an exhaust flow.

In operation, exhaust chamber 262 accepts an exhaust flow 214 from a jet engine through afterburner duct 290 and directs flow 214 through throat 270 and divergent section 298 to exit through opening 266. Flow 214 accelerates as it passes through throat 270 to produce thrust opposite the direction of flow 214. The interaction of the high discharge smooth transition contour shape of exhaust chamber 262 with the proportionally-shaped throat allows nozzle 268 to operate at a relatively low pressure within exhaust chamber 262. The relatively low pressure within exhaust chamber 262 allows flow 214 to enter afterburner duct 290 and throat 270 at subsonic speeds, but to accelerate to supersonic speeds as it passes through throat 270 and expands into divergent section 298. Thus, a secondary flow from an pulsed ejector type injector 276 located proximate to throat 270 will not cause the creation of a shock wave if the secondary flow is directed at flow 214 when it is subsonic. Flow 214 reaches supersonic speeds along a sonic plane 302 which is depicted in FIG. 12, and which occurs after flow 14 passes injectors 276 and 308. Sonic plane 302 divides flow 214 into a subsonic portion proximate to exhaust chamber 262 and a supersonic portion proximate to exit 266.

Referring now to FIG. 12, lines 304 represent the mass flow characteristics of flow 214, passing through nozzle 268. As flow 214 passes through throat 270, the energy of flow 214 is translated from a high pressure and low velocity into a low pressure and high velocity. Injectors 276 and 308 provide a flow that partially blocks throat 270 and thus skews sonic plane 302 of flow 214. When a plurality of injectors provide a symmetrical secondary flow around the periphery of throat 270, the effective cross sectional area of throat 270 is decreased, causing an increase in pressure within exhaust chamber 262 and an increase in the velocity of flow 214 as it accelerates through throat 270. Controlling the amount of blockage provided by the secondary flow from injectors 76 can control the pressure within afterburner duct 88.

When an injectors 276 and 308 provide an asymmetric flow around the periphery of throat 270 into the subsonic flow 214, flow 214 expands more rapidly along the nozzle wall associated with the greater blockage of throat 270, inducing the expanding flow proximate to the greater blockage to reach sonic speeds more rapidly than flow distal to the greater blockage. The ten-degree deflection indicated by angle 306 reflects the vectoring of thrust, which could result from the introduction of an asymmetric flow at the subsonic portions of flow 214. The asymmetry of the flow can be created by a number of variations to the flow from each pulsed ejector type injector 276 and 308 including variations to the injection orientation, mass flow characteristics, and pulse frequency, wave form, and amplitude. The asymmetric flow is created because each pulsed ejector type injector 276 and 308 has defined, localized influence on flow 214, which can be further controlled by separating each pulsed ejector type injector with sidewalls.

Supplemental injection port 308 enhances thrust vectoring produced by an asymmetric flow from injectors 276 by providing an additional flow to flow 214 aft of sonic plane 302. Port 308 provides an additional flow to skew sonic plane 302 towards port 308, but does not produce a shock wave.

The throttling and vectoring functions of nozzle 268 can be combined to provide a versatile nozzle design for afterburning, low observable or other engines. Total injected mass flow from injectors 276 and 308 can control throttling by providing a proper amount of blockage of nozzle 268 at throat 270. The distribution of the injected mass flow asymmetrically between different injectors provides vectoring for a given throttle setting, with the angle of vector dependent upon the distribution of the injected mass flow. Similarly, variations in pulsing characteristics and pulsed ejector type injector orientation can provide simultaneous throttling and vectoring of flow 214 with an effective nozzle. In a nozzle having some variable geometry characteristics, variations in the contour and shape of the exhaust chamber, convergence section, throat and divergent section can also enhance vectoring of flow 214.

A nozzle that provides a combination of throttling and vectoring of an exhaust flow from a jet engine can provide many advantages, particularly in high performance tactical aircraft. A fixed nozzle comprised of thermally optimized materials, as opposed to mechanically oriented materials, can be incorporated into an aircraft, dramatically decreasing the weight and complexity of the aircraft's propulsion system. The thrust produced by exhaust flow from the aircraft's engine can produce pitch and yaw vectors without the movement of external surfaces, resulting in smaller external surfaces at the tail of the aircraft and an associated reduction in aircraft drag. A fixed nozzle can also be applied to non-circular aperture shapes. Injection of a secondary flow into the subsonic primary flow can produce vectoring and throttling without creating shocks and the thrust losses associated with such shocks.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A pulsed ejector type injector, comprising:
   a primary pulsed or unsteady fluid flow contained within an inner nozzle;
   a secondary fluid flow contained within a shroud, wherein said primary fluid flow is injected into said secondary fluid flow; and
   a mixing section wherein said secondary fluid flow is entrained by said primary fluid flow, and wherein said diffuser section's geometry is determined by properties of said primary and secondary fluid flow and geometry.

2. The pulsed ejector type injector of claim 1, wherein a ratio of a cross-sectional area of said inner nozzle to a cross-sectional area of said shroud is such that said primary pulsed or unsteady fluid flow is dissipated within the boundaries of said shroud.

3. The pulsed ejector type injector of claim 1, wherein a length of said mixing section is such that acoustic waves generated by said primary pulsed or unsteady fluid flow supplement entrainment of said secondary fluid flow to improve a pumping efficiency of the pulsed ejector.

4. The pulsed ejector type injector of claim 3, wherein said length of said diffuser is based on a harmonic of said frequency of said pulsed or unsteady primary flow.

5. The pulsed ejector type injector of claim 1, further comprising a controller capable of varying a frequency, duty cycle and amplitude of said pulsed or unsteady primary flow in order to vary an efficiency of the pulsed type injector.

6. A synthetic jet pulsed ejector, comprising:
   a diaphragm located at one end of a plenum capable of moving cyclically between an in-stroke and out-stroke position;
   an orifice located along said plenum;
   a driver operable to drive said diaphragm between said in-stroke and out-stroke positions, wherein on an in-stroke of said diaphragm secondary fluid is pulled into said plenum, and wherein on an out-stroke said secondary exits said plenum as a primary jet;
   a shroud containing said secondary fluid, wherein said primary jet is injected into said secondary fluid flow; and
   a diffuser section wherein said secondary fluid flow is entrained by said primary jet, and wherein said diffuser section's geometry is determined by properties of said primary fluid flow.

7. The synthetic jet pulsed ejector of claim 6, wherein a ratio of a cross-sectional area of said plenum to a cross-sectional area of said shroud is such that said primary jet is dissipated laterally within the boundaries of said shroud.

8. The synthetic jet pulsed ejector of claim 7, wherein said ratio of shroud cross-sectional area to plenum cross-sectional area is between 2:1 and 3:1.

9. The synthetic jet pulsed ejector of claim 6, wherein a length of said diffuser section is such that as said entrained fluid flow exits the injector, a low pressure is experienced at an outlet of said plenum.

10. The synthetic jet pulsed ejector of claim 9, wherein said length of said diffuser is based on a harmonic of said frequency of said pulsed or unsteady primary flow.

11. The synthetic jet pulsed ejector of claim 6, further comprising a controller capable of varying a frequency and amplitude of said diaphragm in order to vary an efficiency of the synthetic pulsed type injector.

12. A system for vectoring a primary flow in an engine nozzle by varying an effective throat or sonic plane within the primary flow, comprising:
   an opening for accepting the main flow;
   at least one pulsed ejector located wherein said at least one pulsed ejector type injector is inclined to oppose the main flow;
   at least one supplemental pulsed ejector wherein said at least one supplemental pulsed ejector is located downstream of the at least one primary pulsed ejector, wherein said at least one supplemental pulsed ejector is inclined to oppose the main flow, and wherein the at least one primary and supplemental ejectors provide a flow field opposed to a subsonic portion of the primary flow in order to vector the main flow; and
   at least one controller operable to direct said at least one primary and supplemental pulsed ejector to provide a flow operable to vary the effective throat.

13. The system of claim 12, wherein said at least one controller is operable to vector the main flow along an intended vector.

14. The system of claim 13, wherein said intended vector is contained within an intended vector plane.

15. The system of claim 14, wherein said at least one primary and supplemental ejectors provide a flow field opposed to the main flow in said intended vectoring plane, parallel to said intended vectoring plane in a longitudinal plane, and that is parallel to the primary flow axis in a third plane orthogonal to said intended vector.

16. The system of claim 12, wherein a location, size, and/or orientation of said effective throat are varied.

17. The system of claim 12, further comprising:
at least one mechanical actuator coupled to said at least one controller, wherein said at least one controller directs said at least one mechanical actuator to provide at least one fluidic pulse to said at least one primary and supplemental pulsed ejector.

18. The system of claim 17, wherein said at least one mechanical actuator comprises a mechanical valve.

19. The system of claim 17, wherein the at least one mechanical actuator comprises an acoustic vibrator.

20. The system of claim 19, wherein said at least one primary and supplemental pulsed rotates relative to said throat of the nozzle.

21. The system of claim 12, wherein said controller further comprises:
a processor operable to execute software instructions to control the effective throat of the primary flow over a range of operating conditions.

22. The system of claim 12, wherein a fluidic pulse from said at least one supplemental pulsed ejector type injector is operable to skew a boundary of the sonic plane of the primary flow towards said at least one supplemental pulsed ejector.

23. The system of claim 12, wherein said at least one primary and supplemental pulsed ejector provide a symmetric flow field in order to vector the main flow.

* * * * *